United States Patent
Shimbaru (10) Patent No.: US 7,986,435 B2
(45) Date of Patent: Jul. 26, 2011

(54) COLOR PROCESSING APPARATUS AND COLOR PROCESSING METHOD

(75) Inventor: Susumu Shimbaru, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 546 days.

(21) Appl. No.: 12/125,792

(22) Filed: May 22, 2008

(65) Prior Publication Data

US 2008/0297818 A1    Dec. 4, 2008

(30) Foreign Application Priority Data

May 28, 2007   (JP) ................................ 2007-140562

(51) Int. Cl.
*H04N 1/60* (2006.01)

(52) U.S. Cl. ......... 358/1.9; 358/504; 358/518; 358/520; 345/591

(58) Field of Classification Search .................. 358/1.9, 358/518, 520, 504; 382/162, 167; 345/591, 345/600, 601
See application file for complete search history.

(56) References Cited

U.S. PATENT DOCUMENTS

| | | | | |
|---|---|---|---|---|
| 6,075,888 A | * | 6/2000 | Schwartz | 382/167 |
| 6,373,595 B1 | * | 4/2002 | Semba et al. | 358/1.9 |
| 6,388,674 B1 | * | 5/2002 | Ito et al. | 345/590 |
| 7,457,003 B1 | * | 11/2008 | Marcu et al. | 358/1.9 |
| 7,609,413 B1 | * | 10/2009 | Marcu et al. | 358/1.9 |
| 7,729,011 B2 | * | 6/2010 | Harigai | 358/1.9 |
| 2004/0051888 A1 | * | 3/2004 | Zolliker | 358/1.9 |
| 2006/0188157 A1 | * | 8/2006 | Kondo et al. | 382/167 |
| 2006/0285136 A1 | * | 12/2006 | Shin et al. | 358/1.9 |
| 2007/0019860 A1 | * | 1/2007 | Yoshida et al. | 382/162 |
| 2007/0052985 A1 | * | 3/2007 | Presley et al. | 358/1.9 |
| 2007/0242291 A1 | * | 10/2007 | Harigai | 358/1.9 |
| 2008/0037041 A1 | * | 2/2008 | Hasegawa et al. | 358/1.6 |
| 2010/0091034 A1 | * | 4/2010 | Matsumoto et al. | 345/601 |
| 2010/0128981 A1 | * | 5/2010 | Kurumisawa et al. | 382/167 |

FOREIGN PATENT DOCUMENTS

JP         2004-064668 A       2/2004

* cited by examiner

*Primary Examiner* — Kimberly A Williams
(74) *Attorney, Agent, or Firm* — Canon U.S.A. Inc., I.P. Division (57) ABSTRACT

A color processing apparatus includes a calculation unit configured to calculate a correction value from reference color information in an input color gamut and reference color information in a reference color gamut, a correction unit configured to correct reference target color information in the reference color gamut based on the correction value to calculate target color information, and a color conversion unit configured to convert an input color in the input color gamut into an output color within an output color gamut by using the target color information.

6 Claims, 14 Drawing Sheets

| COLOR MATCHING SETTING UI |
|---|
| PROFILE OF IMAGE DISPLAY DEVICE ▽     PROFILE OF IMAGE OUTPUT DEVICE ▽ |
| MATCHING METHOD ▽ |

COLOR PROCESSING APPARATUS AND COLOR PROCESSING METHOD

BACKGROUND OF THE INVENTION

1. Field of the Invention

The present invention relates to a color processing apparatus and a color processing method for converting an input color into an output color within an output color gamut.

2. Description of the Related Art

With recent popularization of personal computers and workstations, desktop publishing (DTP) and computer-aided design (CAD) have come into wide use. Under these circumstances, a color reproduction technology for matching a color displayed on a monitor by a computer with a color reproduced on an output medium has gained in importance. For example, in DTP, a user carries out work based on a flow of creating, editing, and processing a color image on the monitor and outputting a resultant image via a color printer. In this workflow, the user has a strong desire for perceptual matching between the color image on the monitor and the printer output image.

However, in the case of the color reproduction technology, achievement of perceptual matching between the color image on the monitor and the printer output image is difficult. This difficulty arises for the following reason.

In a color monitor, light of a predetermined wavelength is emitted from a fluorescent material to display a color image. On the other hand, in a color printer, light of a predetermined wavelength is absorbed by ink, and a color image is represented by residual reflected light. Such a difference in image display form causes a large difference in color gamut between the color monitor and the color printer. Even in the case of color monitors, color gamuts vary between a liquid crystal monitor and a cathode-ray tube monitor of the electron gun type. Even in the case of color printers, color gamuts vary due to a difference in paper quality or ink composition. Thus, with regard to an image on a color monitor and a color printer output image, or color printer output images output from several types of machines or with plural types of paper qualities, complete matching of colors of these images is difficult in terms of colorimetry.

For such display media different from each other in color gamut, as a technology for absorbing the color gamut difference and perceptually matching display images with each other, a gamut mapping technology for mapping a certain color gamut into another color gamut in a L*a*b* space or a JCh space is available. The following gamut mapping technologies have conventionally been known.

(1) A method for mapping the entire color gamut linearly.
(2) A method for mapping only colors outside a color gamut to the surface of the color gamut.
(3) A method for preserving the original color as much as possible for in-gamut colors, and mapping out of gamut colors to high saturated region of the gamut, for example toward a point on the L axis, to preserve gradation.

However, according to such a conventional gamut mapping technology, optimal mapping is carried out for each printer color gamut. Thus, when the same image is output with printers of different color gamuts, colors of the output image may be different.

Because of a difference in color gamut, apparently, reproduction of a completely identical color cannot be realized. Advisably, however, the color appearance of an output image has to be similar as much as possible.

Japanese Patent Application Laid-Open No. 2004-64668 discusses a method for increasing color identity even when output conditions are different by correcting a target color in an equi-hue direction according to the output condition of a printer.

The method discussed in Japanese Patent Application Laid-Open No. 2004-64668 can increase color identity with respect to an output color gamut. However, as target color data is designed optimal for an input color gamut, if an input color gamut varies, target color data has to be changed for each input color gamut. Accordingly, plural sets of target colors are required. Preparation of a target color beforehand for an optional input color gamut is difficult. As a result, highly accurate color reproduction irrespective of an input color gamut is difficult to be realized.

SUMMARY OF THE INVENTION

The present invention is directed to realizing highly accurate target color reproduction even for an optional input color gamut by correcting target color data based on input color gamut information to eliminate a necessity of generating plural sets of target color data.

According to an aspect of the present invention, a color processing apparatus includes a calculation unit configured to calculate a correction value from reference color information in an input color gamut and reference color information in a reference color gamut, a correction unit configured to correct reference target color information in the reference color gamut based on the correction value to calculate target color information, and a color conversion unit configured to convert an input color in the input color gamut into an output color within an output color gamut by using the target color information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
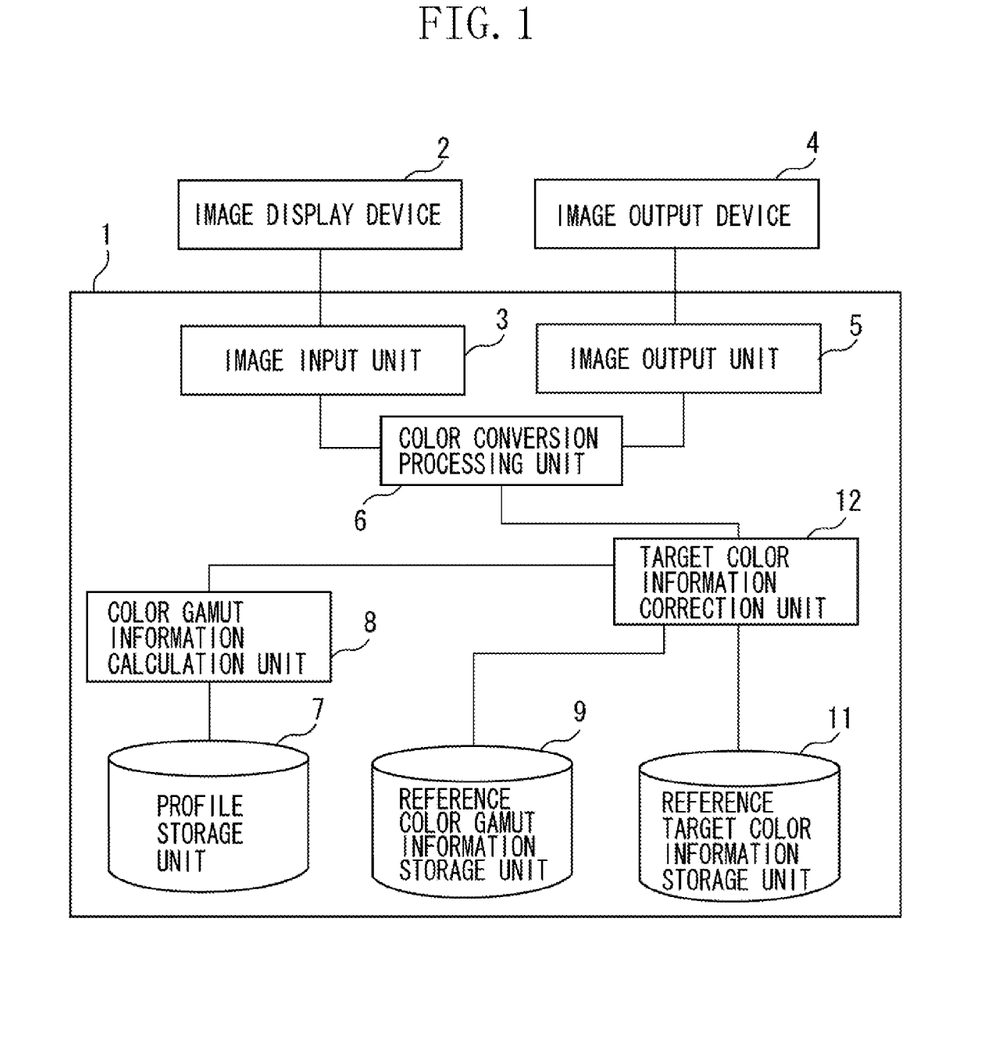
FIG. 1 is a block diagram illustrating a configuration of an image processing system according to an exemplary embodiment of the present invention.

FIG. 1 is a block diagram illustrating a configuration of an image processing system according to an exemplary embodiment of the present invention.

The image processing system according to the exemplary embodiment includes an image processing apparatus 1, an image display device 2, such as a monitor for displaying an image, and an image output device 4, such as a printer for printing an image. An example configuration of the image processing apparatus 1 will be described below. An image input unit 3 inputs image data displayed on the image display device 2. An image output unit 5 outputs image data to the image output device 4. A color conversion processing unit 6 performs color conversion on image data input by the image input unit 3. A profile storage unit 7 stores profiles of the image display device 2 and the image output device 4. A color gamut information calculation unit 8 calculates color gamut information of a selected profile. A reference color gamut information storage unit 9 stores reference color gamut information. A reference target color information storage unit 11 stores reference target color information corresponding to the reference color gamut information stored in the reference color gamut information storage unit 9. A target color information correction unit 12 corrects the reference target color information based on color gamut information of the image display device 2 and the reference color gamut information.

Figure 2:
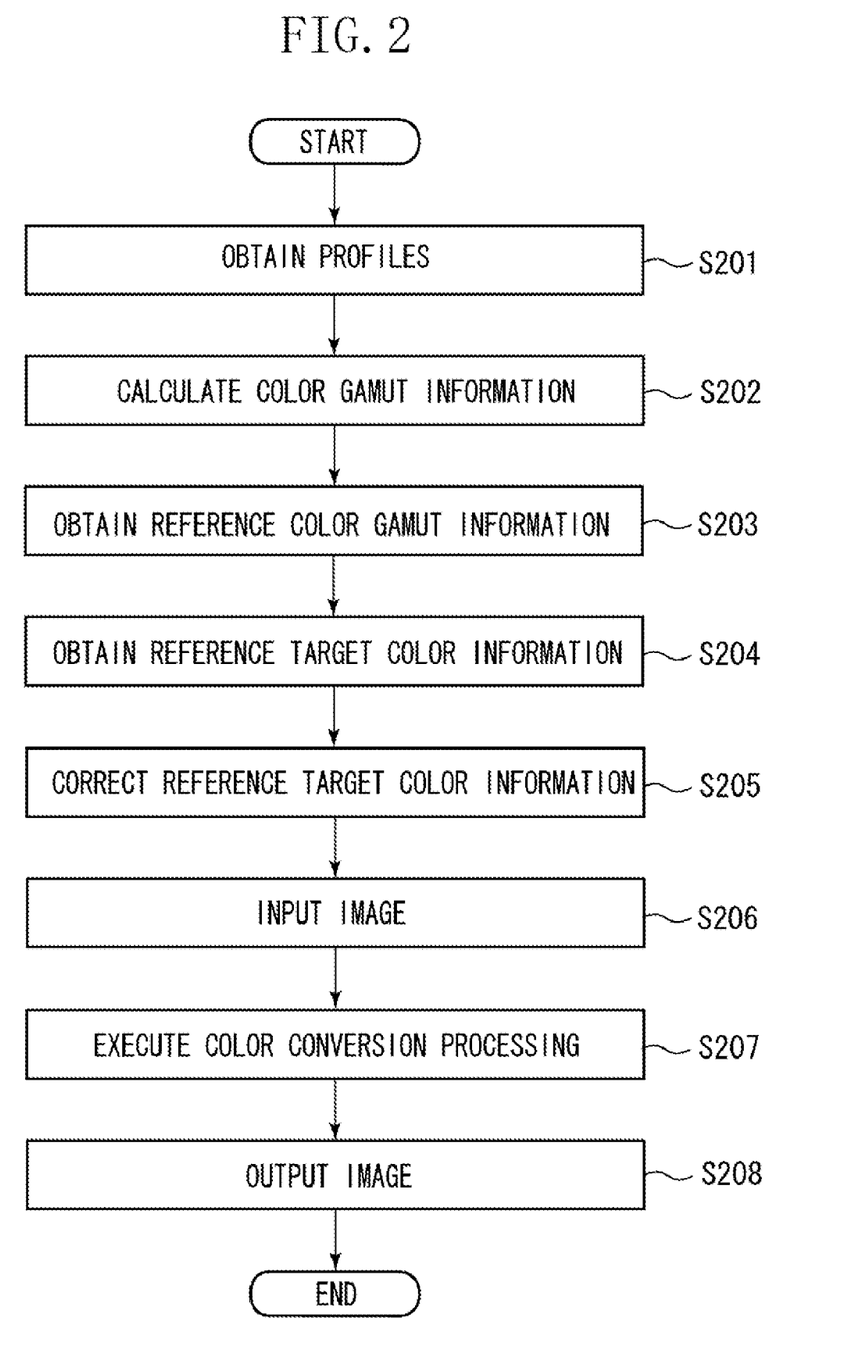
FIG. 2 is a flowchart illustrating a processing flow for an image processing apparatus.
Figure 3:
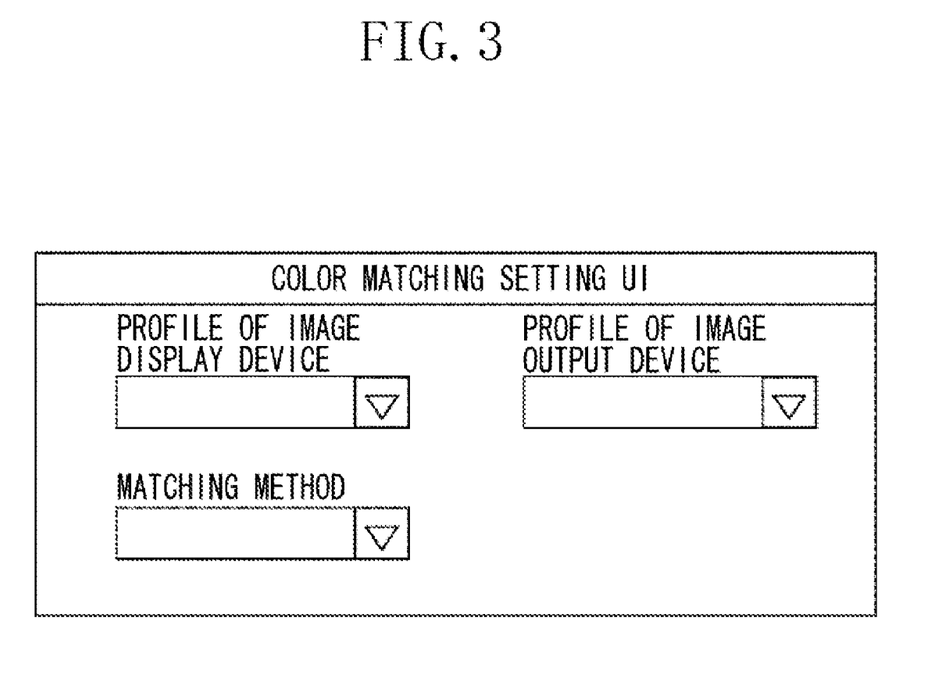
FIG. 3 illustrates an example of a user interface (UI) for setting color matching.

FIG. 2 is a flowchart illustrating a processing flow for the image processing apparatus 1. FIG. 3 illustrates a user interface (UI) for setting conditions required for color matching. This UI allows a user to select and set a profile of the image display device 2, which corresponds to a source device for color matching, a profile of the image output device 4, which is a destination device for color matching, and a matching method for color matching.

In step S201, the color gamut information calculation unit 8 obtains the profiles of the image display device 2 and the image output device 4 selected via the color matching setting UI from the profile storage unit 7. Each profile contains, for example, a correspondence between a device value and a colorimetric value as device characteristic information. For example, each profile contains, as device characteristic information, calorimetric values (XYZ values) of a patch corresponding to data that has nine gradations for each of R, G, and B (totally 729 colors).

In step S202, the color gamut information calculation unit 8 calculates color gamut information of the image display device 2 and color gamut information of the image output device 4 based on the profiles of the image display device 2 and the image output device 4 read in step S201. According to an exemplary embodiment, the color gamut information calculation unit 8 generates color gamut information in the L*a*b* color space. First, the color gamut information calculation unit 8 converts calorimetric values (XYZ values) of the profile into L*a*b* values.

Figure 4:
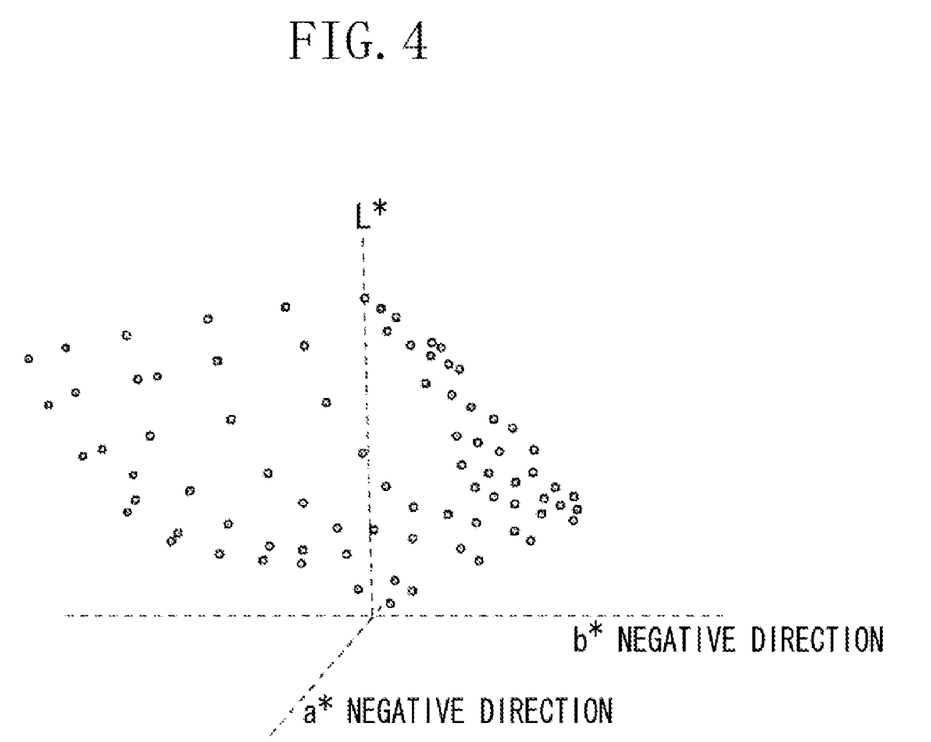
FIG. 4 illustrates an example of color distribution information of a color gamut.
Figure 5:
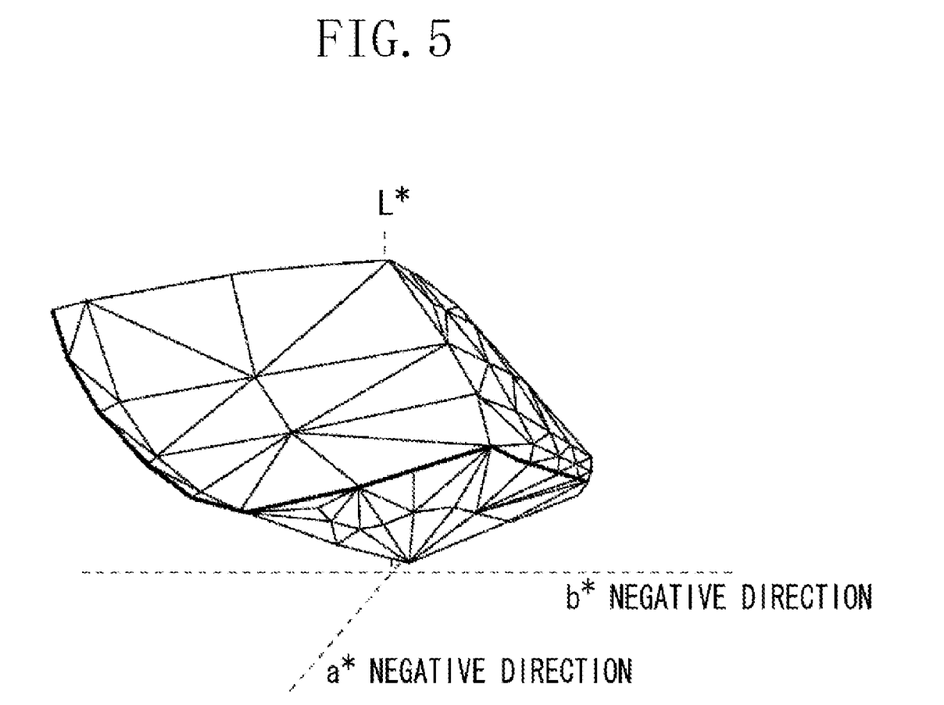
FIG. 5 illustrates an example of gamut shell information generated according to the convex hull method.

The color gamut calculation unit 8 generates and stores, using the convex Hull method, gamut shell information based on a color distribution of a group of the calorimetric values. FIG. 4 illustrates an example of color distribution information. FIG. 5 illustrates an example of gamut shell information. The gamut shell information is represented by a combination of a plurality of polygons.

The color gamut information calculation unit 8 calculates and stores L*a*b* values of primary colors (red, green, blue, cyan, magenta, and yellow) as primary color information. When device values are RGB values, L*a*b* values of calorimetric values corresponding to the following RGB values are L*a*b* values of the primary colors:

Red [(R, G, B)=(255, 0, 0)]
Green [(R, G, B)=(0, 255, 0)]
Blue [(R, G, B)=(0, 0, 255)]
Cyan [(R, G, B)=(0, 255, 255)]
Magenta [(R, G, B)=(255, 0, 255)]
Yellow [(R, G, B)=(255, 255, 0)]

In step S203, the target color information correction unit 12 obtains reference color gamut information from the reference color gamut information storage unit 9. The reference color gamut information contains gamut shell information and primary color information of a reference color gamut. According to an exemplary embodiment, the reference color gamut information is an sRGM color gamut. However, for example, another color gamut, such as an Adobe RGB color gamut or a device color gamut, can be used.

In step S204, the target color information correction unit 12 obtains reference target color information from the reference target color information storage unit 11. The reference target color information indicates, for example, L*a*b* values in a certain printer color gamut whose colors best match six colors of primary color values of the sRGB color gamut. The reference target color information is prestored as table data in the reference target color information storage unit 11. According to an exemplary embodiment, the reference target color information indicates six colors of the primary color values. However, the reference target color information can indicate seven or more colors according to a user's request.

In step S205, the target color information correction unit 12 corrects the reference target color information obtained in step S204 based on the color gamut information of the image display device 2 and the reference color gamut information and supplies the corrected reference target color information to the color conversion processing unit 6. The correction process for the reference target color information in step S205 will be described in further detail below with reference to the flowchart of FIG. 6.

In step S206, the color conversion processing unit 6 inputs image data input via the image input unit 3.

In step S207, the color conversion processing unit 6 executes color conversion on the input image data by using the profiles of the image display device 2 and the image output device 4 obtained in step S201 and the target color information supplied from the target color information correction unit 12. The color conversion process in step S207 will be described below with reference to the flowchart of FIG. 10.

In step S208, the image output unit 5 supplies the image data color-converted in step S207 to the image output device 4.

Figure 6:
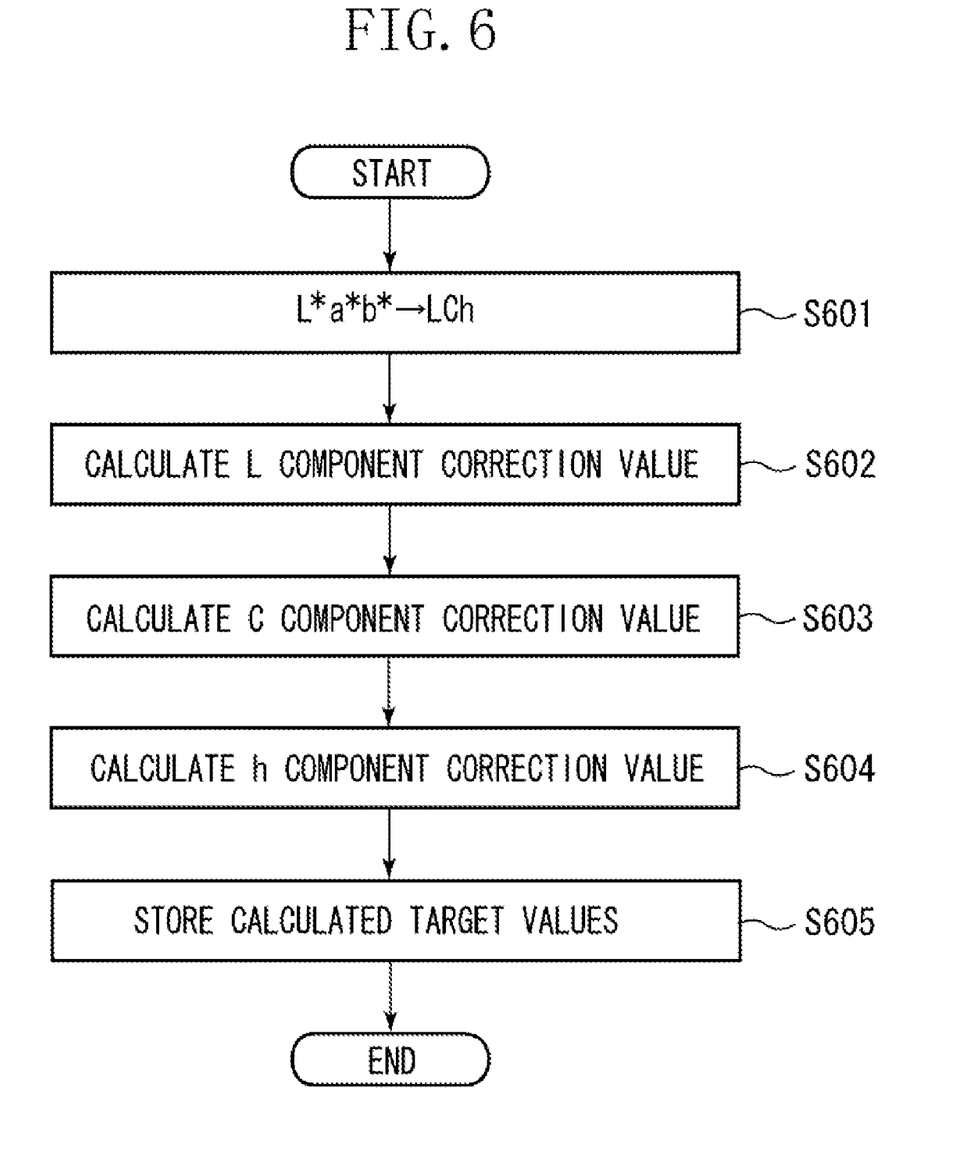
FIG. 6 is a flowchart illustrating a processing flow for correcting reference target color information.
Figure 7:
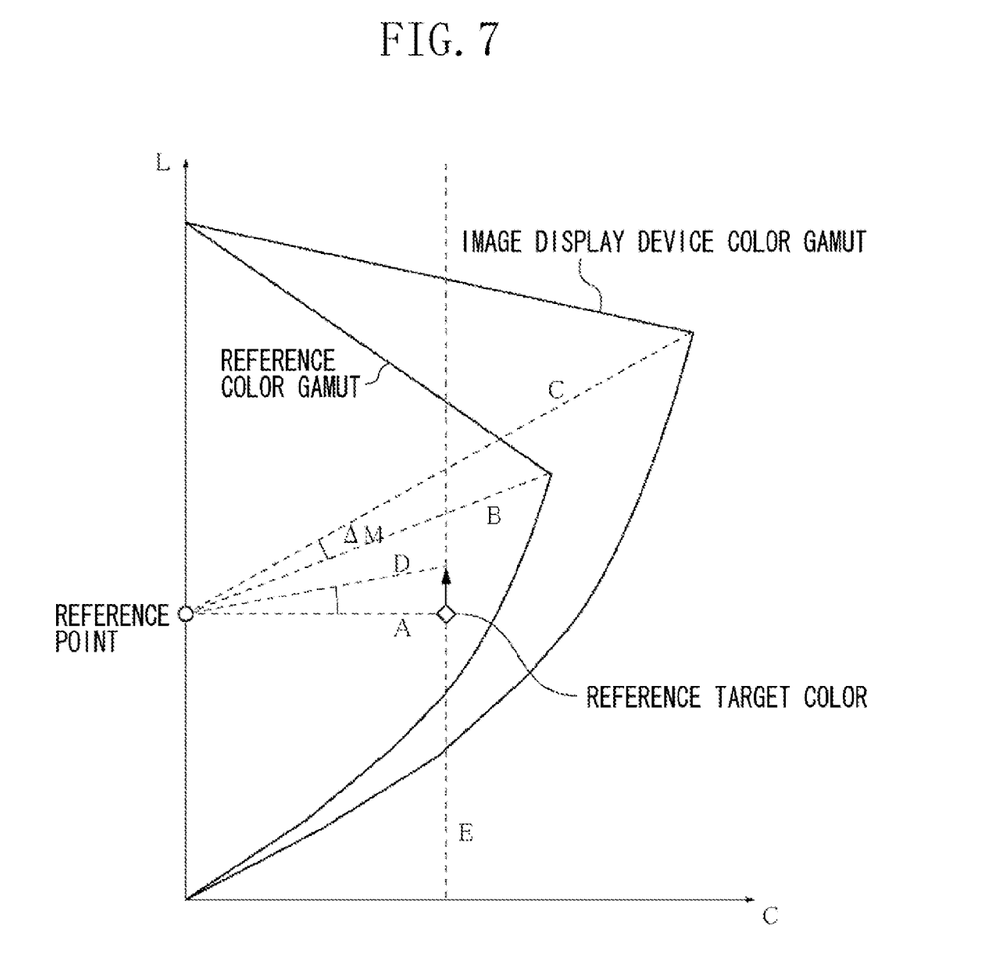
FIG. 7 is a diagram illustrating L component correction of the reference target color information.
Figure 8:
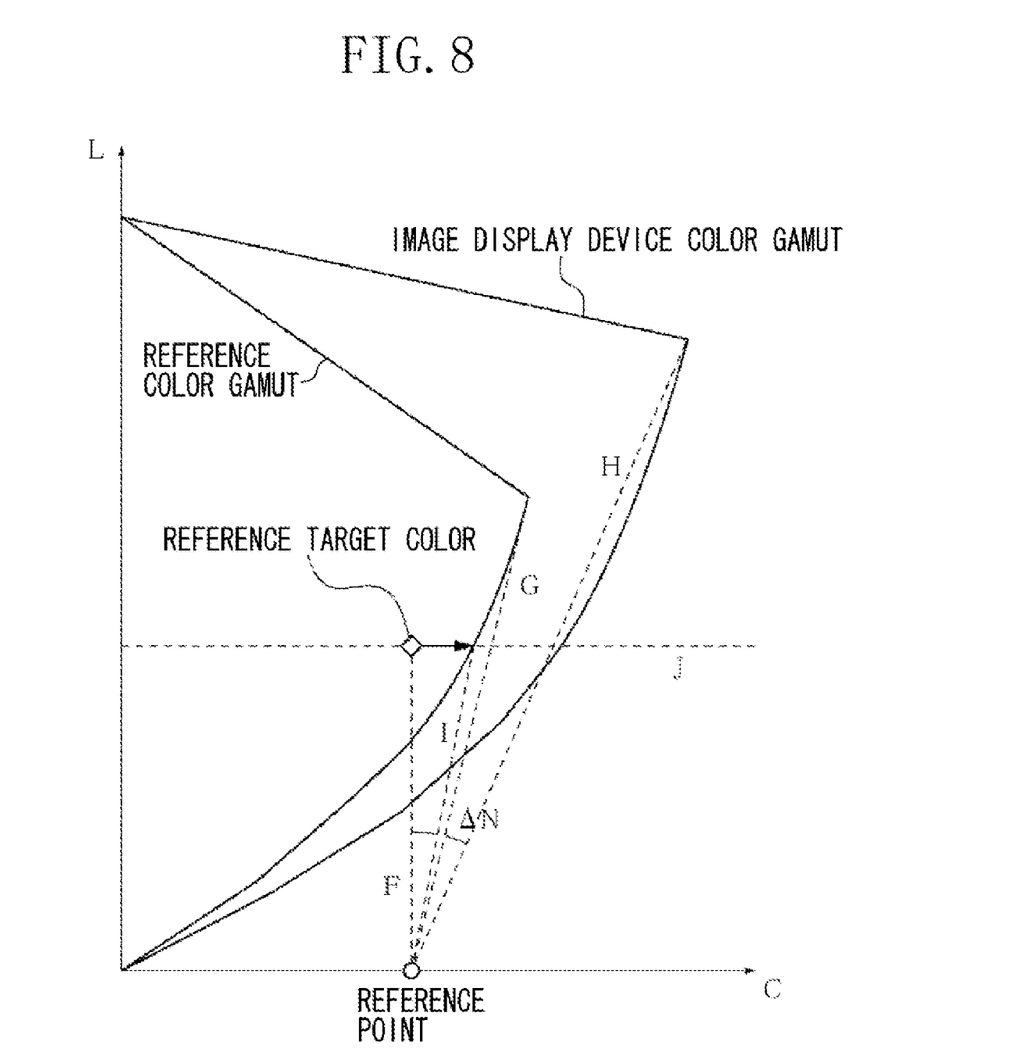
FIG. 8 is a diagram illustrating C component correction of the reference target color information.
Figure 9:
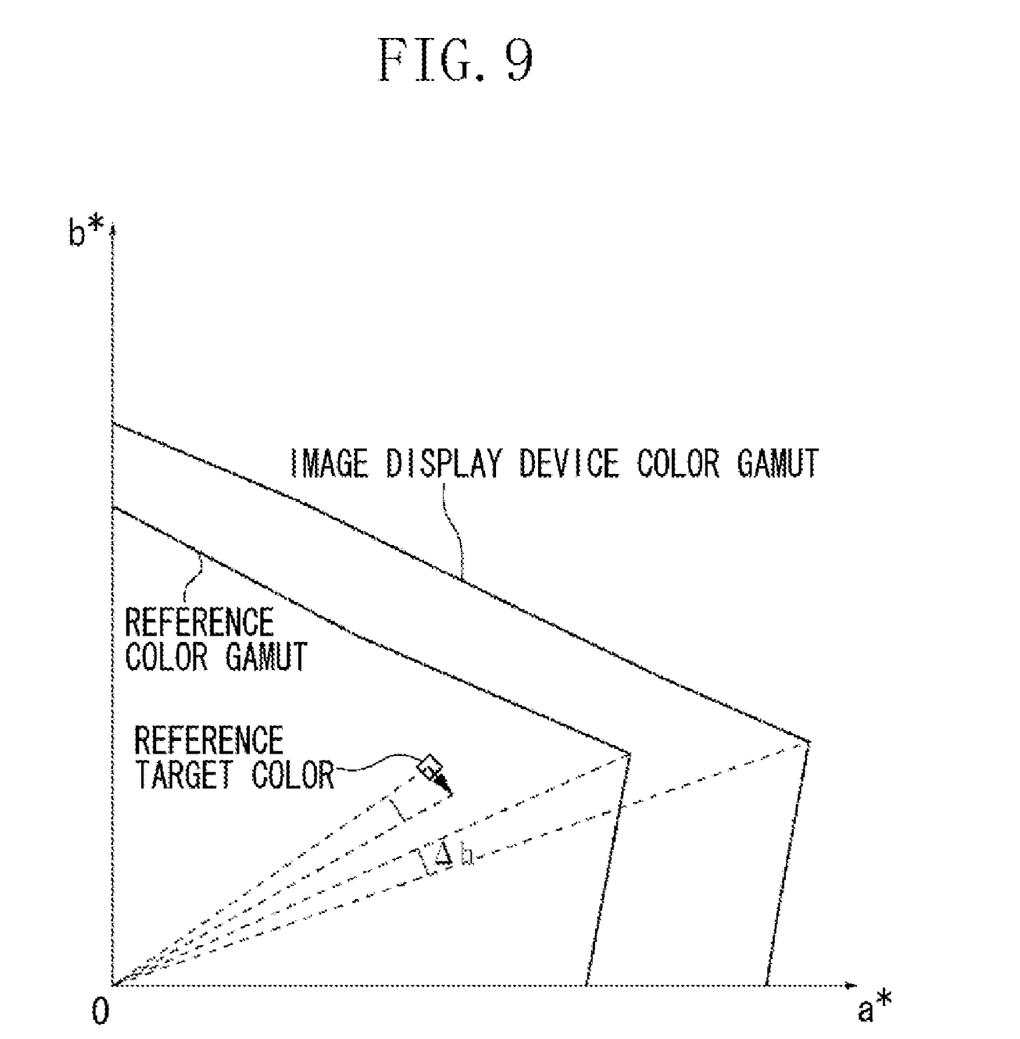
FIG. 9 is a diagram illustrating h component correction of the reference target color information.

The correction process for the reference target color information in step S205 will be described below with reference to the flowchart of FIG. 6. According to an exemplary embodiment, as illustrated in FIGS. 7 to 9, the target color information correction unit 12 obtains a difference between primary color information of the image display device 2 and primary color information of a reference color gamut. Based on the obtained difference, the target color information correction unit 12 corrects reference target color information corresponding to the reference color gamut to calculate target color information corresponding to a color gamut of the image display device 2.

First, in step S601, the target color information correction unit 12 converts L*a*b* values of the primary color information of the image display device 2, the primary color information of the reference color gamut, and the reference target color information into LCh values, in which L indicates a lightness (brightness) component, C indicates a saturation (chroma) component, and h indicates a hue component.

In step S602, the target color information correction unit 12 calculates a difference between the L component of the primary color information of the image display device 2 and the L component of the primary color information of the reference color gamut to correct the reference target color information.

FIG. 7 is a diagram for target color correction of a lightness component according to an exemplary embodiment, in other words, a hue sectional diagram of certain primary color information. A line A connects a reference target color with a reference point, which is a point on an L axis equal in lightness to the reference target color. A line B connects a primary color of a reference color gamut with the reference point. A line C connects a primary color of an image display device color gamut with the reference point. An angle M is defined between the lines B and C. A line D is a straight line shifted from the line A by the angle M around the reference point. A line E is a perpendicular line to a C axis passing through the reference target color. An L component of an intersection point between the lines D and E is an L component of a corrected target color.

In step S603, the target color information correction unit 12 calculates a difference between a C component of the primary color information of the image display device 2 and a C component of the primary color information of the reference color gamut to correct the reference target color information. FIG. 8 is a diagram for C component target color correction according to an exemplary embodiment, in other words, a hue sectional diagram of certain primary color information. A line F connects a reference target color with a reference point, which is a point on a C axis equal in saturation to the reference target color. A line G connects a primary color of a reference color gamut with the reference point. A line H connects a primary color of the image display device color gamut with the reference point. An angle N is defined between the lines G and H. A line I is a straight line shifted from the line F by the angle N around the reference point. A line J is a perpendicular line dropped from the reference target color to the L axis. An intersection point between the lines I and J is a C component of a corrected target color.

In step S604, the target color information correction unit 12 calculates a difference between an h component of the primary color information of the image display device 2 and an h component of the primary color information of the reference color gamut to correct the reference target color information. FIG. 9 is a diagram for h component target color correction according to an exemplary embodiment, in other words, an a*b* plane diagram of certain primary color information. The target color information correction unit 12 calculates a hue difference Δh between a primary color of a reference color gamut and a primary color of the image display device color gamut, and sets a result of adding the hue difference Δh to a hue of a reference target color as an h component of a corrected target color. In step S605, the target color information correction unit 12 stores the calculated target values.

Steps S602 to S604 are carried out for each of the primary colors. In other words, according to an exemplary embodiment, target values are calculated for six colors of red, green, blue, cyan, magenta, and yellow.

Figure 10:
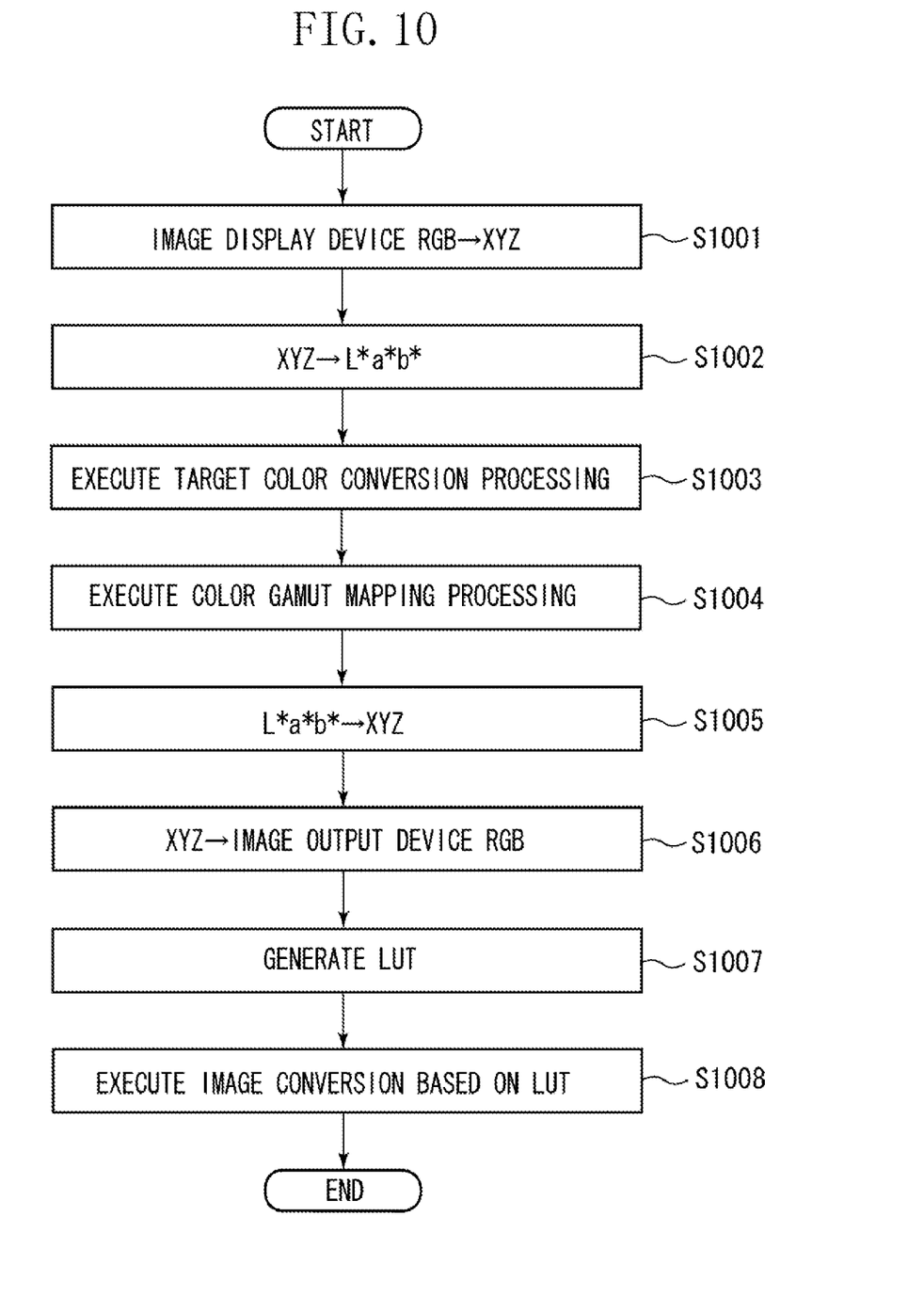
FIG. 10 is a flowchart illustrating a flow of a color conversion process.

The color conversion process in step S207 will be described below with reference to the flowchart of FIG. 10. In step S1001, the color conversion processing unit 6 obtains a relation between device RGB values of grid points and XYZ values contained in the image display device profile. In step S1002, the color conversion processing unit 6 coverts the XYZ values of each grid point into L*a*b* values. In step S1003, the color conversion processing unit 6 executes target color conversion for the L*a*b values of each grid point obtained in step S1002 according to a process described below. The target color conversion process in step S1003 will be described in further detail below with reference to the flowchart of FIG. 11.

In step S1004, the color conversion processing unit 6 executes color gamut mapping for the L*a*b* values of each grid point after the target color conversion in step S1003. Since a value after the target color conversion may be outside the image output display color gamut (output color gamut) depending on a shape of the image output device color gamut, all of the grid points have to be mapped within the output color gamut via color gamut mapping to realize color conversion so that colors can be reproduced by the image output device. According to an exemplary embodiment, calorimetric color mapping is used as a color gamut mapping process. The colorimetric color gamut mapping is a method for mapping colors outside the image output device color gamut to closest points of the image output device color gamut while keeping colors within the image output device color gamut as they are. However, the color mapping process carried out in this case is not limited to the calorimetric color gamut mapping. Other methods can be used.

In step S1005, the color conversion processing unit 6 converts the L*a*b* values after the color gamut mapping into XYZ values. In step S1006, the color conversion processing unit 6 converts the XYZ values into device RGB values of the image output device color gamut by using the image output device profile. In step S1007, the color conversion processing unit 6 correlates the device RGB values of the image display device of each grid point obtained in step S1001 with the device RGB values of the image output device color gamut obtained in step S1006 to generate a look-up table (LUT). In step S1008, the color conversion processing unit 6 converts the RGB values of the image input in step S206 into RGB values of the image output device color gamut by using the LUT generated in step S1007. Input RGB values that are not present in the LUT are obtained from surrounding grid points via interpolation, such as tetrahedron interpolation.

Figure 11:
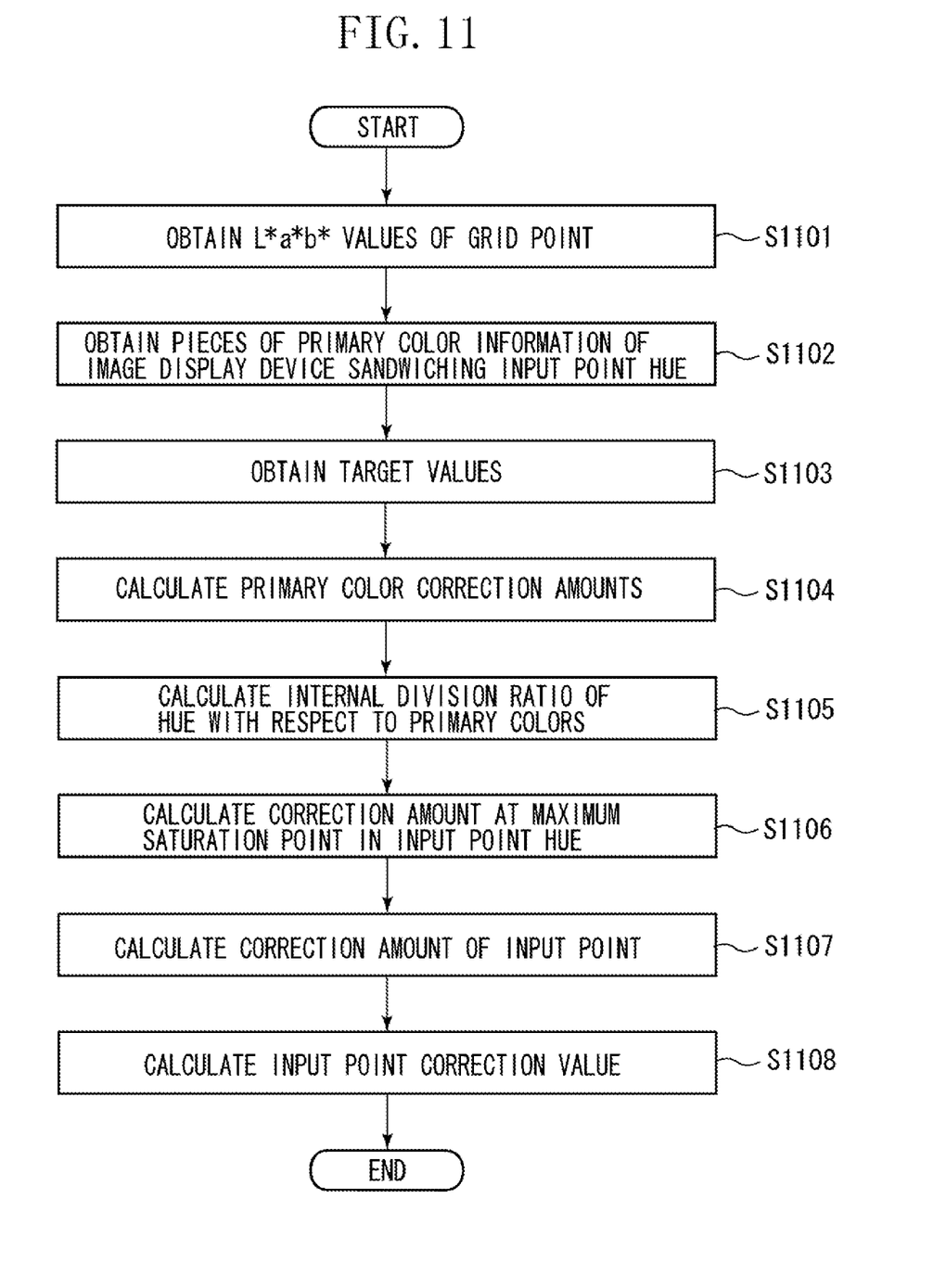
FIG. 11 is a flowchart illustrating a flow of a target color conversion process.
Figure 12A:
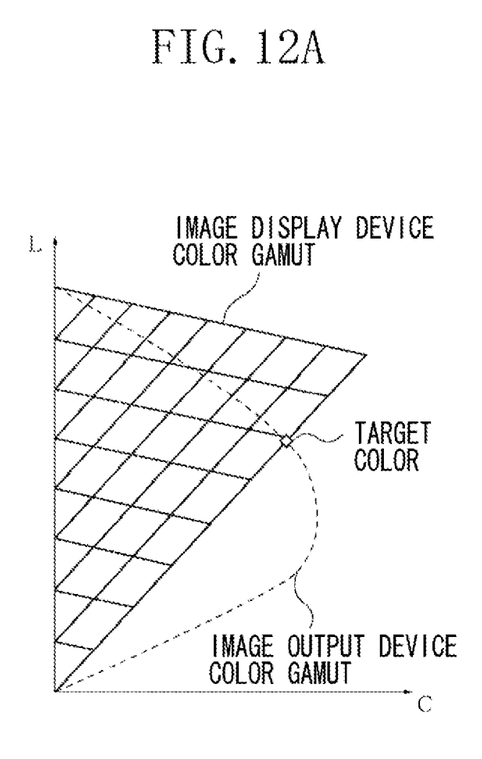
FIGS. 12A and 12B are diagrams illustrating the target color conversion process.
Figure 12B:
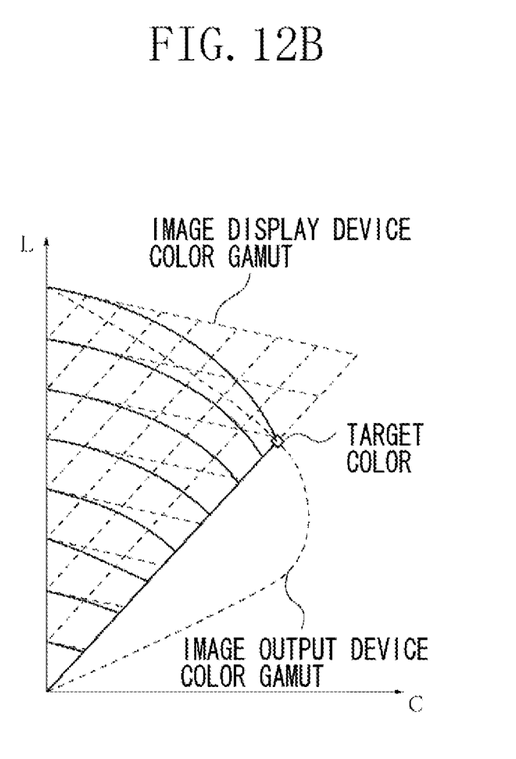

The target color conversion process in step S1003 will be described below with reference to the flowchart of FIG. 11. FIGS. 12A and 12B are diagrams for target color conversion according to an exemplary embodiment. FIG. 12A illustrates an example of a grid point distribution in a certain equi-hue plane of an image display device color gamut before the target color conversion process. FIG. 12B illustrates an example of a grid point distribution of an image display device color gamut in an equi-hue plane after the target color conversion process.

In step S1101, the color conversion processing unit 6 obtains L*a*b* values of each grid point converted in step S1002. In step S1102, the color conversion processing unit 6 calculates a hue of the obtained grid point to obtain pieces of image display device primary color information of forward and backward directions sandwiching the hue. In step S1103, the color conversion processing unit 6 obtains two target values corresponding to the two pieces of primary color information obtained in step S1102.

In step S1104, the color conversion processing unit 6 calculates differences in each primary color between the two pieces of primary color information obtained in step S1102 and the two pieces of corrected target color information obtained in step S1103 and sets the differences as correction amounts. In step S1105, the color conversion processing unit 6 calculates an internal division ratio of an input point hue value with respect to hue values of the two pieces of primary color information. In step S1106, the color conversion processing unit 6 performs interpolation on the correction amounts of the two pieces of primary color information using the internal division ratio to set the interpolated amount as a correction amount at a maximum saturation point in an input point hue. In step S1107, the color conversion processing unit 6 multiplies the correction amount at the maximum saturation point calculated in step S1106 by a ratio between the input point saturation and the maximum saturation point in the input point hue to calculate a correction amount of the input point.

This process is carried out for the purpose of weighting the correction amount by saturation to faithfully reproduce low-saturation colors with little correction.

In step S1108, the color conversion processing unit 6 adds the correction amount obtained in step S1107 to the input point to set a correction value after the target color conversion process.

Thus, according to an exemplary embodiment, based on the reference target color of the reference color gamut, a target color can be calculated according to an optional input color gamut (image display device color gamut). As a result, color processing for realizing a color reproduction suited to the input color gamut can be carried out while taking a color reproduction of the reference color gamut into consideration.

Figure 13:
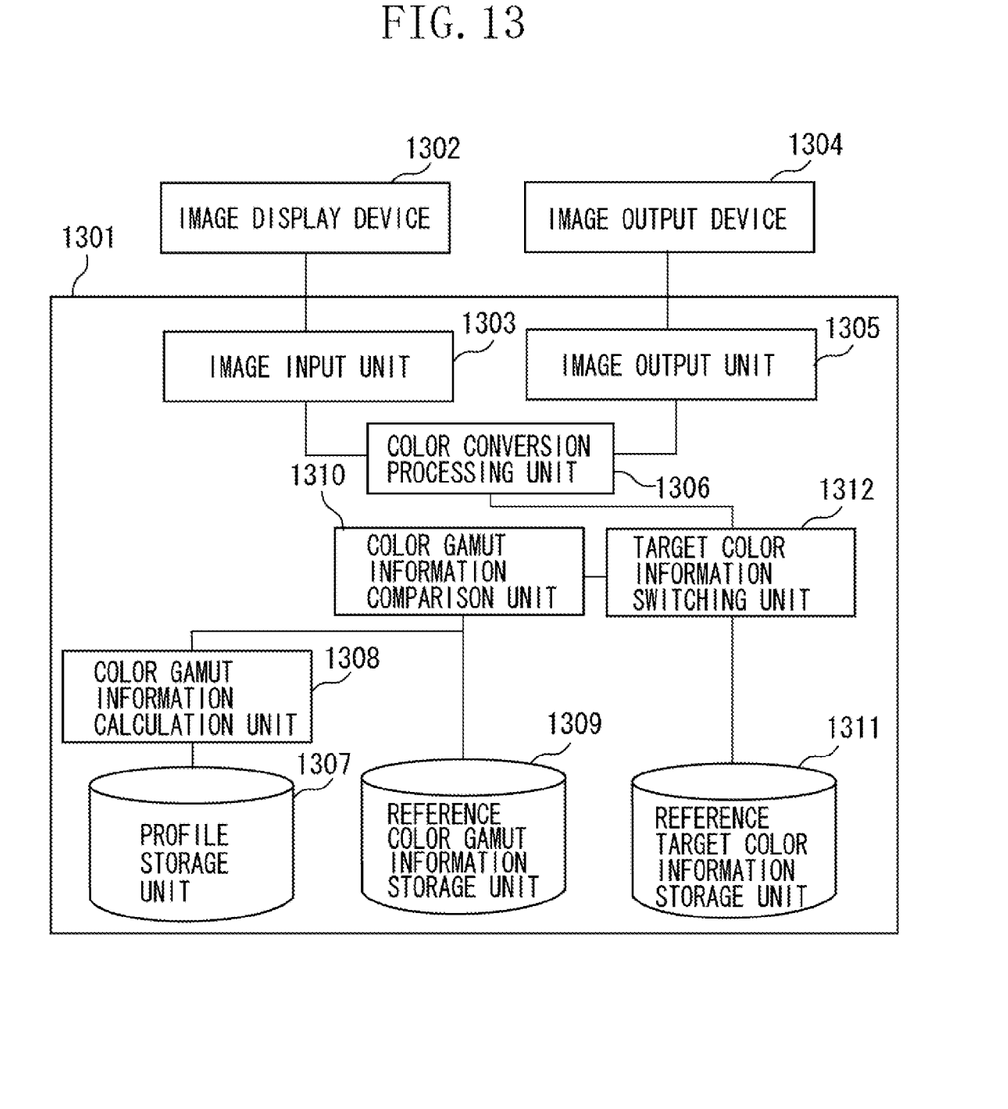
FIG. 13 is a block diagram illustrating a configuration of an image processing system according to an exemplary embodiment of the present invention.

FIG. 13 is a block diagram illustrating an example of a configuration of an image processing system according to another exemplary embodiment of the present invention.

The image processing system according to the exemplary embodiment includes an image processing apparatus 1301, an image display device 1302, such as a monitor for displaying an image, and an image output device 1304, such as a printer for printing an image. An example configuration of the image processing apparatus 1301 will be described below. An image input unit 1303 inputs image data displayed on the image display device 1302. An image output unit 1305 outputs an image via the image output device 1304. A color conversion unit 1306 executes color conversion for the image data input by the image input unit 1303. A profile storage unit 1307 stores profiles of the image display device 1302 and the image output device 1304. A color gamut information calculation unit 1308 calculates color gamut information of a profile selected by a user from the profile storage unit 1307. A reference color gamut information storage unit 1309 sores plural pieces of reference color gamut information. A color gamut information comparison unit 1310 compares the color gamut information calculated by the color gamut information calculation unit 1308 with the reference color gamut information obtained from the reference color gamut information storage unit 1309. A reference target color information storage unit 1311 stores reference target color information corresponding to the reference color gamut information stored in the reference color gamut information storage unit 1309. A target color information switching unit 1312 switches between pieces of reference target color information based on a result of the comparison carried out by the color gamut information comparison unit 1310.

Figure 14:
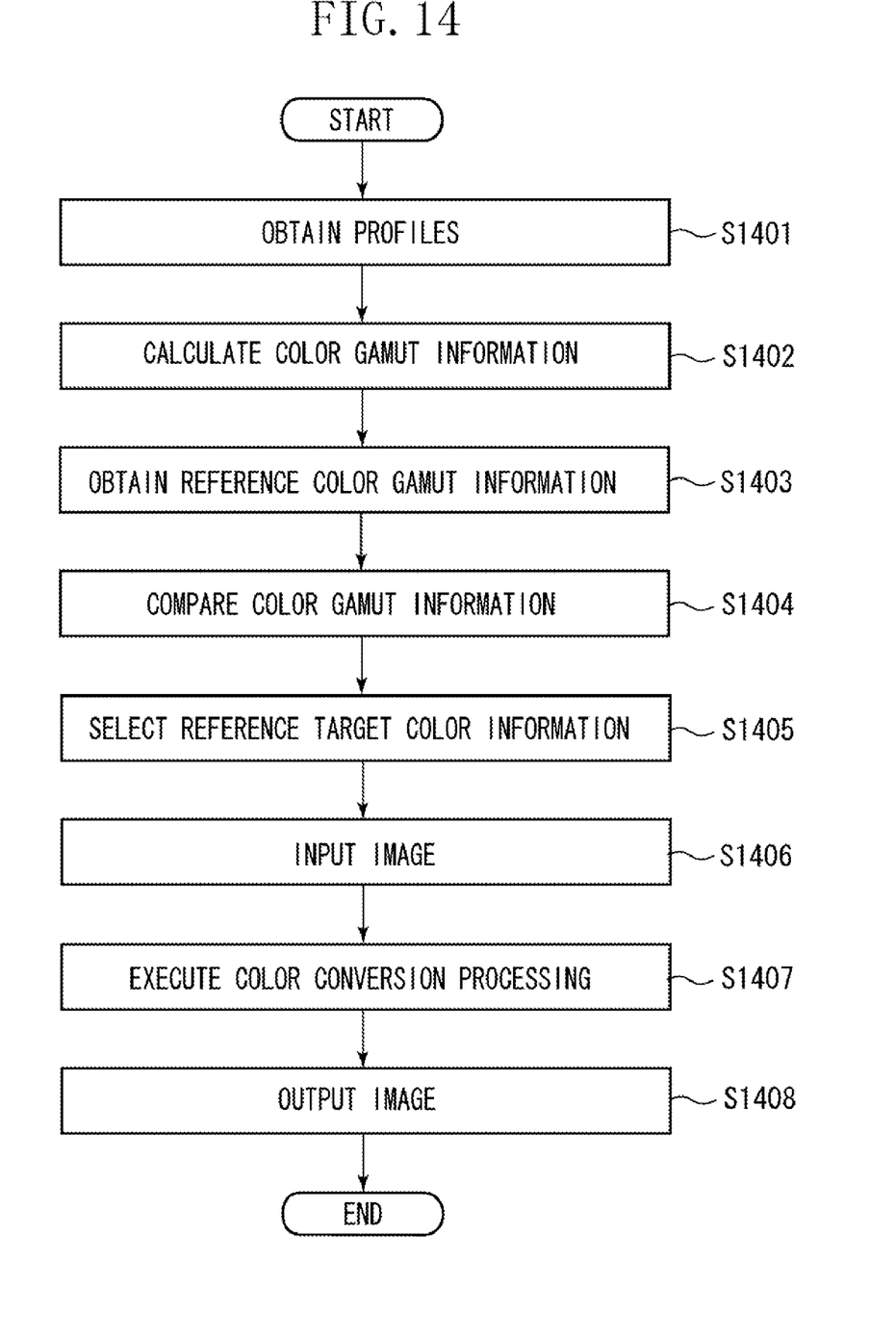
FIG. 14 is a flowchart illustrating a processing flow for an image processing apparatus.

FIG. 14 is a flowchart illustrating a process flow for the image processing apparatus 1301. In step S1401, the color gamut information calculation unit 1308 obtains an image display device profile and an image output device profile selected via a color matching setting UI from the profile storage unit 1307.

In step S1402, based on the profiles of the image display device 1302 and the image output device 1304 obtained in step S1401, the color gamut information calculation unit 1308 calculates gamut shell information corresponding to each of the image display device 1302 and the image output device 1304 by using a method similar to that of the exemplary embodiment described above. The color gamut information calculation unit 1308 calculates and stores a volume of a color gamut from the gamut shell information.

In step S1403, the color gamut information comparison unit 1310 obtains reference color gamut information from the reference color gamut information storage unit 1309. The reference color gamut information contains gamut shell information of a reference color gamut and volume information of a color gamut.

In step S1404, the color gamut information comparison unit 1310 compares the volume of the color gamut information of the image display device 1302 calculated in step S1402 with a volume of each of plural pieces of reference color gamut information obtained in step S1403, and supplies a result of the comparison to the target color information switching unit 1312. According to an exemplary embodiment, pieces of reference color information are an sRGB color gamut and an AdobeRGB color gamut. However, pieces of reference color gamut information are not limited to these color gamuts.

In step S1405, based on the color gamut information comparison result in step S1404, the target color information switching unit 1312 selects reference target color information corresponding to reference color gamut information whose volume is closest to the volume of the color gamut information of the image display device 1302 from among plural pieces of reference color information corresponding to the plural pieces of reference color gamut information. The target color information switching unit 1312 obtains the selected reference target color information from the reference target color information storage unit 1311.

In step S1406, the color conversion processing unit 1306 inputs the image data input by the image input unit 1303. In step S1407, the color conversion processing unit 1306 executes color conversion similar to that of the above-described exemplary embodiment by using the profiles of the image display device 1302 and the image output device 1304 obtained in step S1401 and the reference target color information supplied from the target color information switching unit 1312. In step S1408, the image output unit 1305 supplies the image data color-converted in step S1407 to the image output device 1304.

According to the present exemplary embodiment, color reproduction of a reference color gamut closer to an input color gamut (image display device color gamut) can be taken into consideration. Thus, higher quality color reproduction can be realized.

According to the first and second exemplary embodiments, the L*a*b* color space is used as a device-independent color space. However, other color spaces, such as a JCh color space calculated by using a model, e.g., CIECAM02 proposed by International Commission on Illumination (CIE), can be used.

Program code (software) for realizing the functions of the exemplary embodiments can be supplied via a network. In this case, the program code of software itself realizes the functions of the exemplary embodiments. The program code may cooperate with an operating system (OS) running on the computer or other application software to realize the functions of the exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-140562 filed May 28, 2007, which is hereby incorporated by reference herein in its entirety.

What is claimed is:

1. A color processing apparatus comprising:
    an obtaining unit configured to obtain first reference color information in a reference color gamut and reference target color information in an output color gamut which corresponds to the first reference color information;
    a correction unit configured to correct the reference target color information in the output color gamut based on second reference color information in an input color gamut and the first reference color information in the reference color gamut; and
    a color conversion unit configured to convert an input color in the input color gamut into an output color within the output color gamut by using the corrected reference target color information.

2. The color processing apparatus according to claim 1, wherein
    the first reference color information is primary color information in the reference color gamut, and
    the second reference color information is primary color information in the input color gamut.

3. The color processing apparatus according to claim 1, further comprising a selection unit configured to compare the input color gamut with a plurality of reference color gamuts to select one reference color gamut,
    wherein the correction unit uses reference target color information in the selected reference color gamut.

4. The color processing apparatus according to claim 1, wherein the correction unit calculates a difference between the second reference color information in the input color gamut and the first reference color information in the reference color gamut, and corrects the reference target color information by using the calculated difference.

5. A color processing method comprising:
    obtaining, using processing circuitry, first reference color information in a reference color gamut and reference target color information in an output color gamut which corresponds to the first reference color information;
    correcting, using processing circuitry, the reference target color information in the output color gamut based on second reference color information in an input color gamut and the first reference color information in the reference color gamut; and
    converting, using processing circuitry, an input color in the input color gamut into an output color within the output color gamut by using the corrected reference target color information.

6. A non-transitory computer-readable storage medium storing computer-executable instructions for causing a computer to implement the color processing method according to claim 5.

* * * * *